Feb. 13, 1962 — M. T. BROWNING — 3,020,882
ANIMAL HOLDING AND LOADING CHUTE
Filed May 3, 1960 — 3 Sheets-Sheet 1

INVENTOR.
MARION T. BROWNING
BY
Fishburn & Gold
ATTORNEYS

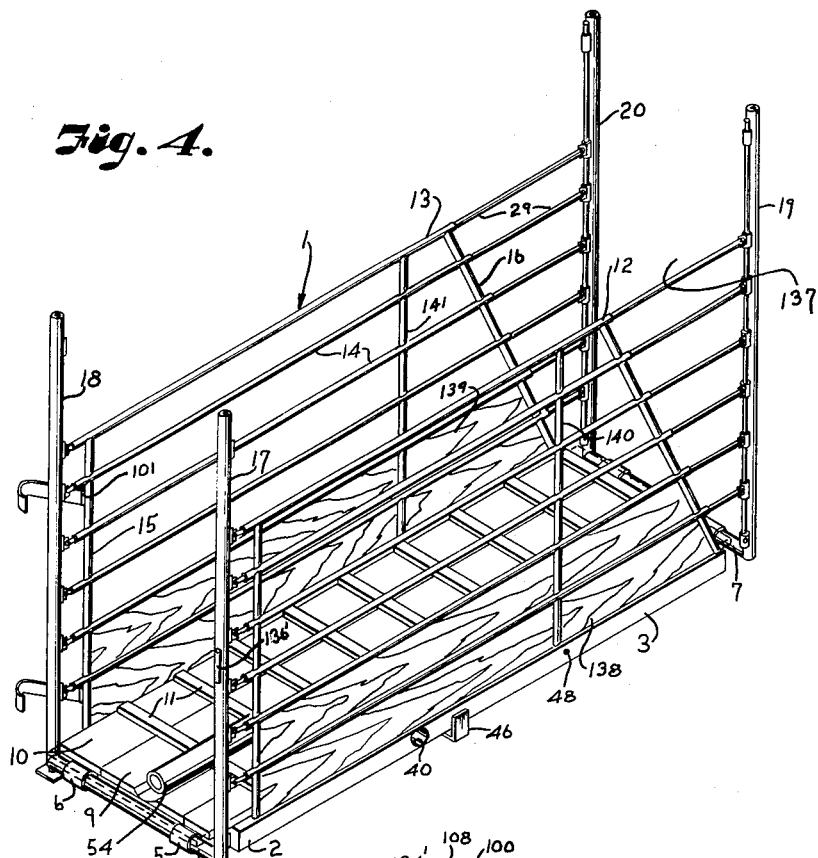

Feb. 13, 1962 M. T. BROWNING 3,020,882
ANIMAL HOLDING AND LOADING CHUTE
Filed May 3, 1960 3 Sheets-Sheet 3

INVENTOR.
MARION T. BROWNING
BY
*Fishburn & Gold*
ATTORNEYS

United States Patent Office 3,020,882
Patented Feb. 13, 1962

3,020,882
ANIMAL HOLDING AND LOADING CHUTE
Marion T. Browning, Urich, Mo.
(Star Rte. 2, Box 47, Marble Falls, Tex.)
Filed May 3, 1960, Ser. No. 26,569
7 Claims. (Cl. 119—82)

This invention relates to a livestock loading and holding chute, and more particularly to a chute for loading livestock wherein the sides thereof may be adjusted to the end of the transporting vehicle when the end of the chute is raised to the floor of the transporting vehicle and supported in such raised position.

The principal object of the present invention is to provide a portable loading chute having telescoping side walls for adjustment to align with the open end of a transporting vehicle and a telescoping tongue to which a jack may be attached for raising the front end of the chute to the desired height of the transporting vehicle for loading the livestock and means on the tongue for lengthening or shortening the same to keep the jack in a vertical position.

Other objects of the present invention are to provide the side walls with tubular standards or posts at the front ends thereof having telescoping legs so that when the front end is raised the legs will be extended to engage the ground and support the front end in elevated position; to provide means for locking the legs in extended position; to provide the side walls at the rear end with a standard; to provide spaced lugs on the standards at the four corners of the chute having sleeves for receiving rods rotatable therein; to provide the rods with a plurality of sleeves having lugs thereon to which are pivotally mounted telescoping members for engaging in the tubular members of the side walls of the chute, and to provide means on the tubular members for holding the telescoping members in adjusted position.

Other objects of the present invention are to provide removable wheels and means of attaching the same to the floor or framework of the chute whereby the chute may be transported from place to place for use; to provide the bottom or framework with means for receiving the tongue and removing the same therefrom; to provide the tongue with ratchet and lever means for extending or retracting the hitch end of the tongue to retain the jack in vertical position while raising the front end whereby the tongue and jack may be removed when the legs are set in place after proper height for the front end of the loader has been attained.

Further objects of the present invention are to provide a chute of this character which may be used for a livestock treating chute wherein the wheels are provided and the chute set on the ground and provided with a swingable gate for closing one end having a head holding device for the livestock, particularly cattle, consisting of a stationary member and a movable member for contacting the neck of the animal, the movable member being adjustable and a pivoted adjustable rod for engaging the nose of the animal to hold the head securely in place while the animal is being treated.

Other objects and advantages of this invention will become apparent from the following description taken in connection with the accompanying drawings wherein are set forth by way of illustration and example certain embodiments of this invention.

FIG. 4 is a perspective view of the chute shown sitting on the ground for use as a treating chute.

FIG. 5 is a perspective view of the swinging gate and head mechanism for the chute shown in FIG. 4.

Figure 1:
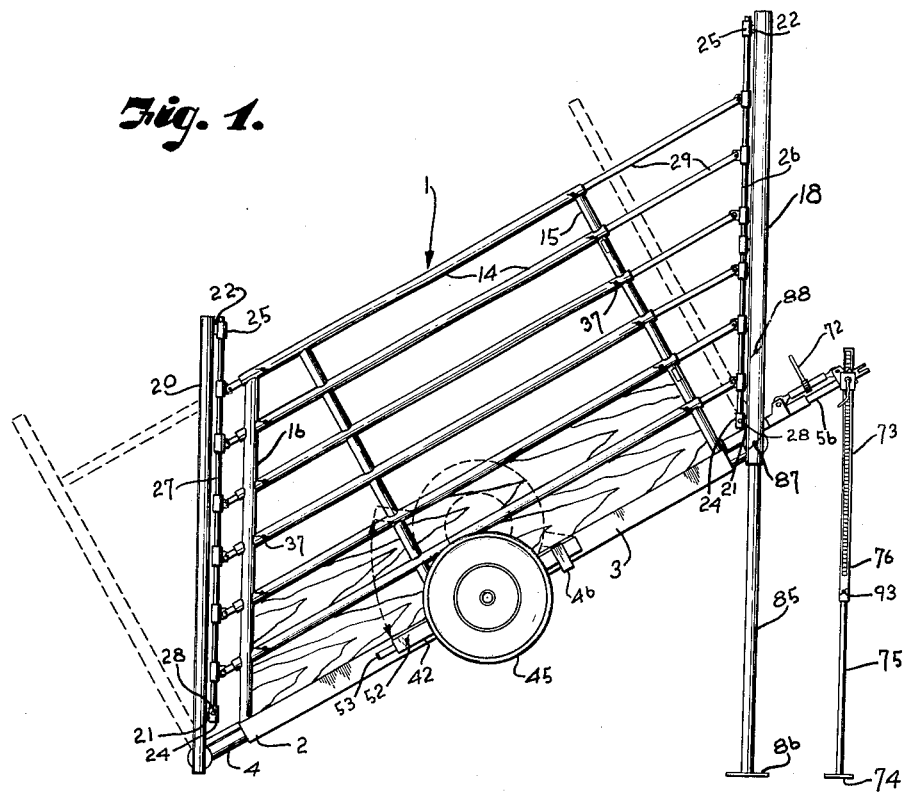
FIG. 1 is a side view of the loading chute showing the front end in jacked up position and the telescoping rods of the side walls at the front extended to move the standards to vertical position.
Figure 2:
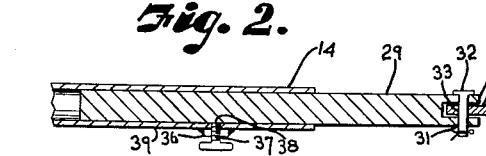
FIG. 2 is a cross sectional elevational view of the telescoping members of the side walls with the screw lock holding the telescoping members in adjusted position.

Referring more in detail to the drawings:

1 designates a loading chute embodying the features of my invention comprising, a frame 2 having angled side channel members 3 and longitudinal spaced tubular members 4 having collars 5 and 6 on their respective ends pivotally connecting the longitudinal rails to cross members 7 and 8. Secured to the longitudinal members 3 and 4 and side angled member 3 is a floor 9 comprising longitudinal boards as indicated at 10 having spaced cross slats 11 to prevent slippage of the feet of the animals when being loaded or treated in the chute. The boards 10 extend outward even with the outer side of the cross members 7 and 8 as shown in dotted lines, FIG. 4, to protect the feet of the animals.

The chute includes sides 12 and 13 consisting of spaced longitudinal members 14 connected near the front end by short tubular members as indicated at 15 by welding or other suitable means and when the chute is in lowered position the tubular members 15 will be in vertical position and the tubular members 14 in horizontal position. The rear ends of the spaced tubular members 14 are connected by tubular members 16 which extend at an angle towards the front end at the top as illustrated in FIG. 4.

Rigidly secured to each end of the tubular member 8 by welding or other suitable means are uprights or standards 17 and 18 also secured to the rear cross member 7 of the bottom framework by welding or other suitable means are tubular uprights or standards 19 and 20. Each of the uprights or standards 17, 18, 19 and 20 are provided with spaced lugs 21 and 22 near their upper and lower ends having open sleeve members 24 and 25 for receiving rods 26 and 27 which are slidable within the sleeves 24 and 25 and the lower sleeves 21 are provided with transverse openings for receiving pins 28 extending through an opening (not shown) in the lower ends of the rods 26 and 27 to hold the rods in the sleeves 24 and 25.

Adapted to telescope within each end of the tubular side members 14 of the chute are rods or tubular members 29 having their outer ends bifurcated as indicated at 30. The bifurcated ends are provided with transverse openings 31 for receiving a pin 32 engaging through an opening 33 of a lug 34 on a sleeve 35 through which the rods 26 and 27 slidably extend. The tubular telescoping members 29 may be adjusted within the tubular members 14 of the side walls through a threaded lug 36 welded or otherwise suitably secured to the side of the tubular members 14 for receiving a threaded thumb screw 37 engaging in a threaded opening 38 in the side walls 39 of the tubular members 14. The end of the thumb screw 37 engages against the tubular member or rod 29 to hold the same in position.

Figure 6:
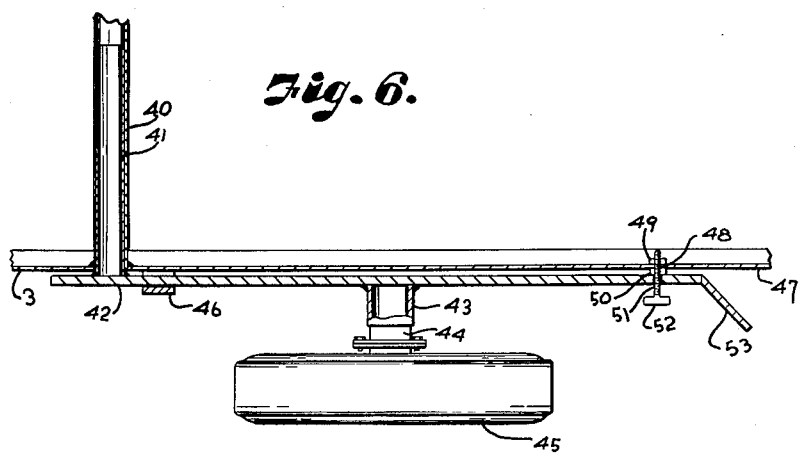
FIG. 6 is an enlarged cross sectional view particularly illustrating the wheel mounting.
Figure 7:
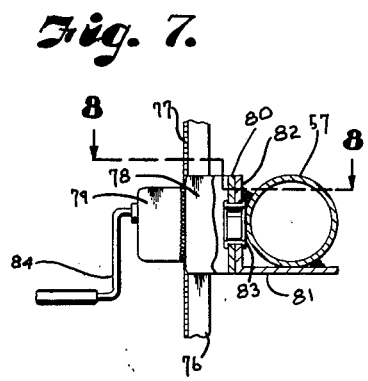
FIG. 7 is an enlarged cross sectional view of the tongue and jack.

The floor 9 of the chute is rested upon cross members (not shown) on the framework structure and extending inwardly from each side of the framework structure are tubular members 40 forming bearings for shafts 41 rigidly secured by welding or other suitable means to arms 42 which extend alongside the angle members 3 of the frame 2 and to which is secured at substantially its center by welding or other suitable means bearings 43 for axles 44 for supporting wheels 45. Keepers 46 are rigidly secured to the angle members 3 and engage the outside of the arm 42 as best illustrated in FIG. 6 to retain the shafts 41 in the bearings 40. The vertical sides 47 of the angle members 3 are provided with an opening 48 and welded on either side thereof are threaded lugs 49 and 50 for receiving the threaded shank 51 of a thumb screw 52 for holding arms in position alongside the angle member 3 when it is desired to transport the chute. The arms 42 are turned outwardly as indicated at 53 so as to form a hand hold to raise the arms and wheels out of the keepers 46 and remove the shaft from the bearings 40 when the device is sitting on the ground to be used as a holding chute.

At substantially the center of the front end of the loading chute and secured to the bottom of the framework structure 2 by welding or other suitable means is a tubular bearing member 54 adapted to receive a sleeved end 55 of a tongue 56 which includes a tubular member 57 telescoped within the sleeved member 55. The sleeved member 55 and bearing 54 are provided with aligned openings as indicated at 58 for receiving a pin 59 to lock the tongue in the bearing 54 and which may be readily removed after the front end of the chute is raised as will later be described for loading purposes.

The lower side of the tubular sleeve 57 is provided with a pin 57' engaging in a slot 58' in the tubular sleeve 55 to prevent turning of the tongue.

Figure 3:
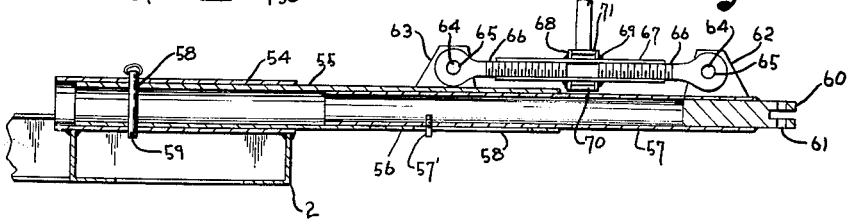
FIG. 3 is an enlarged cross sectional view of the tongue and the screw and rachet mechanism for lengthening or shortening the same.

The outer end of the sleeve 57 of the tongue is provided with a bifurcated end 60 having transverse openings 61 for attaching the tongue to a vehicle or the like for moving the same from place to place. Welded or otherwise rigidly secured to the upper side of the sleeved member 57 is a bracket 62 and to the upper side of the sleeve 55 is a bracket 63 in alignment with bracket 62. The brackets are provided with transverse openings for receiving pins 64 engaging through eyes 65 of threaded shank members 66, threadedly engaged in a sleeve member 67. A ratchet member 68 engages the sleeve 67 as indicated at 69 (FIG. 3) and has teeth 70 thereon which are engaged by teeth 71 of a handle 72. One of the threaded shanks 66 is provided with the left-hand threads and the other right-hand threads so that by working the handle 72 of the ratchet member 68 the threaded sleeve 67 will be rotated to lengthen or shorten the tongue member by telescoping the tubular member 57 in the sleeve 55. This is particularly adaptable for use when the front end of the chute is jacked up as will later be described.

A jack 73 is secured to an angle member 81 which in turn is secured to the sleeves or tubular member 57 for raising the front end of the chute. The jack includes a base 74 attached to a rod 75 telescoped in a member 76 having spaced teeth along one side thereof. Welded or otherwise suitably secured to a housing 78 is a gear box 79 having a worm gear (not shown) engaging with the teeth 77 of the standard 76 of the jack. The housing 78 includes a plate 80 which is rotatably attached to an angle member 81 rigidly secured by welding or other suitable means to the tubular member 57 of the tongue. The vertical arm 82 of the angle member 81 and the plate 80 of the housing are provided with aligned openings for receiving a rivet or bearing member 83 to rotatably mount the gear box of the jack on the tongue.

The purpose of rotation of the gear box with respect to the tongue is to retain the jack in vertical position as the tongue moves upwardly at an angle as indicated in FIG. 1. In raising the tongue as the jack moves upwardly by turning of the crank 84 connected to the gears in the gear box the tongue will be raised and as it is raised the ratchet mechanism may be rotated through operation of the handle 72 to extend the tube 57 outwardly of the sleeve 55 to lengthen the tongue in order that the jack will remain in vertical position.

When the jack has been extended to raise the front end of the loading chute to the desired height to accommodate movement of the animals from the floor of the chute to the floor of the transporting vehicle, the hand screws 37 which hold the standards 17 and 18 in vertical position while the chute is on the ground may be loosened and the upper ends of the standards 17 and 18 pushed from the dotted line position shown in FIG. 1 to vertical position and the screws 37 again tightened. When the chute is raised at the front end the rear standards will be in the position shown in dotted lines FIG. 1 and by loosening the screws 37 the upper end of the standards 19 and 20 may be pushed forwardly to assume a vertical position as shown in FIG. 1 to accommodate the rear end of the chute with respect to a gate structure or building opening through which the animals may be driven to the chute.

The front tubular members 17 and 18 are provided with telescoping legs 85 having feet or bases 86 and are held in telescoped relation with the standards 17 and 18 by hand screws 87 and 88. When the front end of the chute has been elevated and the standards moved to the vertical position as above described, the screws 87 and 88 on each front standard may be loosened so that the legs 85 may drop to the ground and the feet thereof in supporting relation to the ground. The screws 87 and 88 are then tightened to hold the legs extended. The tongue and jack are then removed so that the loading may be accomplished. By rotating the handle 84 in an anti-clockwise direction the pressure on the jack may be released. The tongue may be removed from the frame by removal of the pin 59, FIG. 3, so that this structure will be out of the way during the loading operation.

Figure 8:
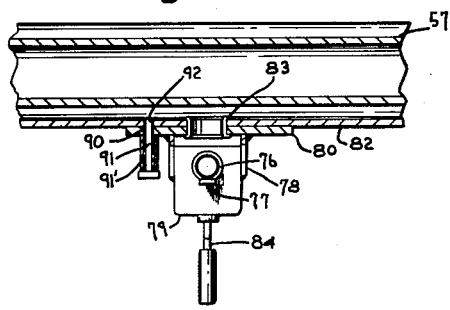
FIG. 8 is an enlarged cross sectional view particularly illustrating the locking mechanism for the jack when in vertical position.

FIG. 8 illustrates the locking mechanism for the jack with respect to the tongue and consists of the plate 80 alongside the angle member 82 having an opening 90 for receiving a pin 91 biased inwardly by spring 91' extending through the plate and through an opening 92 in the angle member as illustrated to prevent rotation of the jack with respect to the tongue member. If it is desired to lock the jack in extended position, a hand screw 93 is provided which operates the same as the hand screw 37 in the framework structure above described.

After the loading is accomplished and it is desired to lower the chute to normal position, the tongue 56 is again placed in the bearing 54 and the pin 59 locking the same in place. The jack is then lowered to lower the chute by counterclockwise rotation of the handle 84 at the same time manipulation of the ratchet mechanism 68 to keep the jack in vertical position. The legs 85 will then again be telescoped in the posts 17 and 18 and may be fastened thereto by the screws 87 and 88. The jack and tongue may then again be removed and the device is ready for transporting if desired.

If the device is desired to be used on the ground as a holding chute, the wheels are removed from the frame by loosening the screw 52 and raising the arm 42 by the handle 53 to disengage the arm from the hook or keeper 46 as shown in dotted lines in FIG. 1. The shaft may be then removed from the bearing 40.

A gate or end member 100 is provided for the front or elevating end of the chute and is hingedly connected to the vertical tubular member 15 on one side of the chute as illustrated in FIG. 4 by hooks or pins 101 welded or otherwise suitably secured to the outside of the tubular members 15. The hooks are engaged by sleeves 102 and 103 secured to the ends of straps or hinges 104 and 105 on the side bar 106 of the gate 100. The gate also includes a side bar 107 and the side bars may be tubular or any suitable construction. Angle members 108 and 109 engage on either side of the upper and lower ends of the side bars 106 and 107 and are welded or otherwise rigidly secured thereto. The angle members 108 and 109 are spaced apart as indicated at 110. Mounted in the spaces 110 are holding bars 111 and 112 for engaging the neck of an animal to be treated. The bar 111 is rigidly mounted in place by welding or other suitable means in the space 110 at the upper and lower ends and has a portion curved toward the bar 107 as indicated at 113. The bar 112 is secured in the lower space 110 by a pin or the like (not shown) engaging in selected openings 114 in the angle members 108 and 109 at the lower end. This bar may be adjusted for accommodating animals of different size. The upper end of the bar 112 is engaged in the space 110 and extends thereabove. The bar 112 is also curved outwardly towards the bar 106 forming a larger opening for accommodating the neck of the animal to be treated. The bars 108 and 109 at the top of the gate are provided with straps 115 and 116 having a plurality of notches 117 and 118 therein. The end of the bar 112 extends above the bars 108 and 109 and is slotted as indicated at 119. Engaging in the slot 119 is a latch member having arms 120 extending from either side of the bar and engaging in the notches 117 and 118. The arms are connected to an upwardly extending arm 121 which extends outwardly of the end of the bar 112 and turned to form a hook or hand member 122 to unlatch the arms 120 from the notches 117 and 118 to adjust the bar to fit the animal.

The side bar 107 is provided with a bracket 123 having a vertical arm 124 upon which is slidably mounted a sleeve 125 having a lug 126 to which is attached the bifurcated end 127 of a nose rod 128 by a pin 129. The side bar 106 of the gate has a keeper or lug 130 extending upwardly in alignment with the bracket 123 having a plurality of notches 131 in which the end 132 of the bar may be adjustably engaged. The nose rod 128 has an outwardly curved portion 133 for engaging over the nose of the animal when its head extends through the opening 134 of the bars 111 and 112. The angle member 109 has a notch 134′ and a keeper member 135′ for receiving the free end 132 of the nose bar 128 to hold it out of the way when the animal enters the chute or when not in use.

When it is desired to use the chute as a holding chute, the gate is closed and latched by a pin 135 slidable in spaced sleeves 136 on the side of the side bar 107 and the end of the pin engages in a sleeve 136′ on the side standard 17 of the chute. The animal may then be driven through the opening 137 in the rear of the chute and driven so that his head will extend between the bars 111 and 112. The bar 112 may be adjusted to fit the animal's neck and the nose bar 128 also inserted over the nose of the animal to hold the animal still. Side boards 138 and 139 are placed between the lower horizontal side bars or tubular members 14 to prevent the animals from stepping through the bars when being loaded into a transporting vehicle or when in the chute for treatment. When the animals are being held in the chute a bar (not shown) may be engaged against the upright bars 140 and 141 at substantially the middle of the chute.

It will be obvious that the gate may be swung out of the way and the chute used as a loading chute without detaching the gate therefrom.

It will further be obvious that I have provided an improved loading chute which may be raised at its forward end to the height of the transporting vehicle to be loaded and the sides thereof adjusted to fit the rear end of the transporting vehicle vertically thereof which also may be utilized for a treating chute if desired.

It is to be understood that while I have illustrated and described one form of my invention it is not to be limited to the specific form or arrangement of parts herein described and shown except insofar as such limitations are included in the claims.

What I claim and desire to secure by Letters Patent is:

1. A portable chute for loading livestock into a transporting vehicle comprising, a bottom, side walls including horizontally extending tubular members rigidly supported on said bottom, standards at the respective corners of said bottom, means securing the lower ends of the standards to said bottom for pivotal movement of the standards longitudinally of the chute, rods having one end pivotally connected to said standards and the other end telescoping with said tubular members of said side walls, means for locking said rods in adjusted position with respect to said side walls, and means having connection with one end of the bottom for raising one end of said chute to align with said vehicle.

2. A portable chute for loading livestock into a transporting vehicle comprising, a bottom, side walls including horizontally extending tubular members rigidly supported on said bottom, standards at the respective corners of said bottom, means securing the lower ends of the standards to said bottom for pivotal movement of the standards longitudinally of the chute, rods secured to said standards in vertical alignment therewith, rods having one end pivotally connected to and slidable on said first named rods and the other end telescoping with said tubular members of said side walls, means for locking said rods in adjusted position with respect to said side walls, and means having connection with one end of said bottom for raising said end of said chute to align with said vehicle.

3. A portable chute for loading livestock into a transporting vehicle comprising, a bottom, side walls including horizontally extending tubular members rigidly supported on said bottom, standards at the respective corners of said bottom, means securing the lower ends of the standards to said bottom for pivotal movement of the standards longitudinally of the chute, rods having one end pivotally connected to said standards and the other ends telescoping with said tubular members of said side walls, means for locking said rods in adjusted position with respect to said side walls, a removable tongue secured to said bottom at one end of the chute, a jack having connection with said tongue for raising and lowering said tongue end of said chute, and legs telescoping into the lower ends of said standards at the tongue end thereof whereby said legs may be extended to support said end of the chute when it has been elevated by said jack.

4. A portable chute for loading livestock into a transporting vehicle comprising, a bottom, side walls including horizontally extending tubular members rigidly supported on said bottom, standards at the respective corners of said bottom, means securing the lower ends of the standards to said bottom for pivotal movement of the standards longitudinally of the chute, rods having one end pivotally connected to said standards and the other ends telescoping with said tubular members of said side walls, means for locking said rods in adjusted position with respect to said side walls, a removable tongue secured to said bottom at one end of the chute, a jack having connection with said tongue for raising and lowering said tongue end of said chute, and legs telescoping into the lower ends of said standards at the tongue end thereof thereby said legs may be extended to support said end of the chute when it has been elevated by said jack, and means on said tongue for lengthening said tongue as said jack is operated to raise the end of said chute.

5. A chute for loading livestock into a transporting vehicle body comprising, a bottom, side walls including horizontally extending tubular members rigidly supported on said bottom, standards at the respective corners of said bottom, means securing the lower ends of the standards to said bottom for pivotal movement of the standards longitudinally of the chute, rods secured to said standards in vertical alignment therewith, rods having one end pivotally connected to said first named rods and the other end telescoping with said tubular members of said side walls, means for locking said rods in adjusted position with respect to said side walls, wheels for transporting said chute to a place of use, means removably attaching said wheels to said bottom at substantially the longitudinal center thereof, and means having connection with one end of said chute to the height of said body, the upper ends of said standards being moved forwardly toward said vehicle body to vertically align said forward standards with said body.

6. A portable chute for loading livestock into a transporting vehicle comprising, a bottom, side walls including horizontally extending tubular members rigidly supported on said bottom, standards at the respective corners of said bottom, means securing the lower ends of the standards to said bottom for pivotal movement of the standards longitudinally of the chute, rods having one end pivotally connected to said standards and the other ends telescoping with said side walls whereby said standards may be moved fore and aft, means for locking said rods in adjusted position with respect to said side walls, a telescoping tongue secured to said bottom at one end of the chute, a jack having connection with said tongue for raising and lowering said tongue end of said chute, and means on said telescoping tongue for lengthening said tongue as said jack is operated to raise the end of said chute and shortening said tongue as said chute is lowered to keep said jack in vertical position.

7. A portable chute for loading livestock into a transporting vehicles comprising, a bottom, side walls including horizontally extending tubular members rigidly supported on said bottom, standards at the respective corners of said bottom, means securing the lower ends of the standards to said bottom for pivotal movement of the standards longitudinally of the chute, rods having one end pivotally connected to said standards and the other ends telescoping with said side walls whereby said standards may be moved fore and aft, means for locking said rods in adjusted position with respect to said side walls, a telescoping tongue secured to said bottom at one end of the chute, a jack having connection with said tongue for raising and lowering said tongue end of said chute, legs telescoping into said standards at the tongue end thereof whereby said legs may be extended to support said end of the chute when it has been elevated by said jack, and means on said telescoping tongue for lengthening said tongue as said jack is operated to raise the end of said chute, and shortening said tongue as said chute is lowered to keep said jack in vertical position.

References Cited in the file of this patent
UNITED STATES PATENTS

| | | |
|---|---|---|
| 1,782,554 | Tool | Nov. 25, 1930 |
| 2,703,554 | Hoggard | Mar. 8, 1955 |
| 2,869,513 | Luckett | Jan. 20, 1959 |
| 2,873,904 | McCormick | Feb. 17, 1959 |